(12) United States Patent
Reisman et al.

(10) Patent No.: US 8,433,114 B2
(45) Date of Patent: Apr. 30, 2013

(54) METHOD AND SYSTEM FOR ELASTIC COMPOSITION OF MEDICAL IMAGING VOLUMES

(75) Inventors: James G. Reisman, Plainsboro, NJ (US); Christophe Chefd'hotel, Jersey City, NJ (US)

(73) Assignee: Siemens Aktiengesellschaft, München (DE)

( * ) Notice: Subject to any disclaimer, the term of this patent is extended or adjusted under 35 U.S.C. 154(b) by 902 days.

(21) Appl. No.: 12/556,929

(22) Filed: Sep. 10, 2009

(65) Prior Publication Data

US 2010/0061612 A1    Mar. 11, 2010

Related U.S. Application Data

(60) Provisional application No. 61/095,697, filed on Sep. 10, 2008.

(51) Int. Cl.
*G06K 9/00* (2006.01)

(52) U.S. Cl.
USPC .......................................................... 382/128

(58) Field of Classification Search ................... 382/128
See application file for complete search history.

(56) References Cited

U.S. PATENT DOCUMENTS

| | | | |
|---|---|---|---|
| 2007/0280556 A1* | 12/2007 | Mullick et al. | 382/294 |
| 2009/0129650 A1* | 5/2009 | Hawkes et al. | 382/131 |
| 2009/0297006 A1* | 12/2009 | Suri et al. | 382/131 |

* cited by examiner

*Primary Examiner* — Sheetal R Rangrej
(74) *Attorney, Agent, or Firm* — Donald B. Paschburg; F. Chau & Associates, LLC

(57) ABSTRACT

A method and system for improving the quality of composing image volumes using deformable registration, and a gradual elastic morphing to create a seamless whole body volume image from several component volumes from a 3D medical imager.

30 Claims, 5 Drawing Sheets

METHOD AND SYSTEM FOR ELASTIC COMPOSITION OF MEDICAL IMAGING VOLUMES

CROSS-REFERENCES TO RELATED APPLICATIONS

This application claims priority on provisional application Ser. No. 61/095,697 filed Sep. 10, 2008, which is incorporated herein by reference.

BACKGROUND OF THE INVENTION

Certain references are cited herein. These references are incorporated by reference herein.

Medical image composition is the act of joining image volumes from separate views from a medical image scanner into one consistent seamless whole volume. This is done via the method of composing (also called stitching or mosaicing).

In "stitching", an algorithm is used to fill in the voxels of the output larger volume according to the locations computed by alignment. Where only one input volume overlaps an output voxel location, data is copied directly from the input to the output. Where two or more input volumes overlap at an output voxel, program logic is used to determine how to choose between the input datapoints, or to blend them together. Where no input volume overlaps the output, black voxels are used to fill. FIG. 1 illustrates this concept.

The goals of blending the component volumes are to limit artifacts that can occur from image volume distortion or patent/anatomy motion. These include, (a) limiting visible seams or creases; (b) limiting contrast variation; and (c) limiting ghosting effects due to blending.

The increase of the field strength of newer MR imaging machines (such as the Siemens Trio) provides the opportunity for much improved image resolution and quality. A challenge with these systems is that the increased magnetic strength has resulted in magnifying B0 effects (a magnetic loading distortion effect). B0 effects present themselves as a localized distortion in the volume. B0 distortion can occur anywhere within the volume, but is most pronounced in the regions on the periphery of the iso-center of the volume. Much effort has been made to correct for these effects in the design of MRI installations [1].

Whole body scans of a patient can take up a plurality of 3-5 individual volume acquisitions which are then composed together in order to capture a complete scan of an individual. Since B0 effects are most evident in the leading or trailing edges of a MR volume, having sufficient volume overlap and discarding the leading or trailing regions is a possible solution. However, these kinds of solutions will inevitably result in the need for more volumes, and the more volumes that are required for an individual, the more time individual subject workflow takes which can cut into the efficiency of a MR installation. Also, there is no certainty as to the location(s) where B0 effects might occur in a volume. This makes narrowing the field of view of a volume an expensive and imprecise solution.

B0 effects are not the only artifacts that can interfere with successful composition. Movement of the patient or anatomy between scans can also interfere, and should also be taken into account.

SUMMARY OF THE INVENTION

The invention provides a method and system which uses a process of registration to develop a distortion field between the overlapping regions of two adjoining volumes. Then the method and system includes gradual displacement morphing, and intensity blending is performed to create a seamless transition between the two volumes.

The invention provides a method for composing image volumes obtained using a medical scanning device, comprising the steps of: using a medical scanning device to obtain data of at least two image volumes of a patient, said image volumes having an overlap region; processing the data from the two image volumes to determine the overlap region and to register the two image volumes with each other using rigid registration; determining a non-rigid deformation between the two image volumes using an elastic registration algorithm; performing an alpha-morphing on each overlapping region of each image volume using the non-rigid deformation; and obtaining a blend region of the overlap region by performing an alpha-blending which blends the two image volumes by varying the relative contribution of the two image volumes using the results of alpha-morphing.

The invention provides an article of manufacture comprising a computer-usable medium having computer-readable program code embodied therein for composing a composite image from at least two smaller images, the computer-readable program code having instructions for performing the following steps: obtaining data of at least two image volumes of a patient, said image volumes having an overlap region; processing the data from the two image volumes to determine the overlap region and to register the two image volumes with each other using rigid registration; determining a non-rigid deformation between the two image volumes using an elastic registration algorithm; performing an alpha-morphing on each overlapping region of each image volume using the non-rigid deformation; and obtaining a blend region of the overlap region by performing an alpha-blending which blends the two image volumes by varying the relative contribution of the two image volumes using the results of alpha-morphing.

The invention provides a system for composing an image from two smaller image volumes of data obtained using a medical scanning device, comprising: a scanner for obtaining image data for at least two image volumes of a patient, wherein the image volumes have an overlap region; a processor for: processing the data from the two image volumes to determine the overlap region and to register the two image volumes with each other using rigid registration; determining a non-rigid deformation between the two image volumes using an elastic registration algorithm; performing an alpha-morphing on each overlapping region of each image volume using the non-rigid deformation; and obtaining a blend region of the overlap region by performing an alpha-blending which blends the two image volumes by varying the relative contribution of the two image volumes using the results of alpha-morphing.

DESCRIPTION OF THE PREFERRED EMBODIMENT

Figure 1:
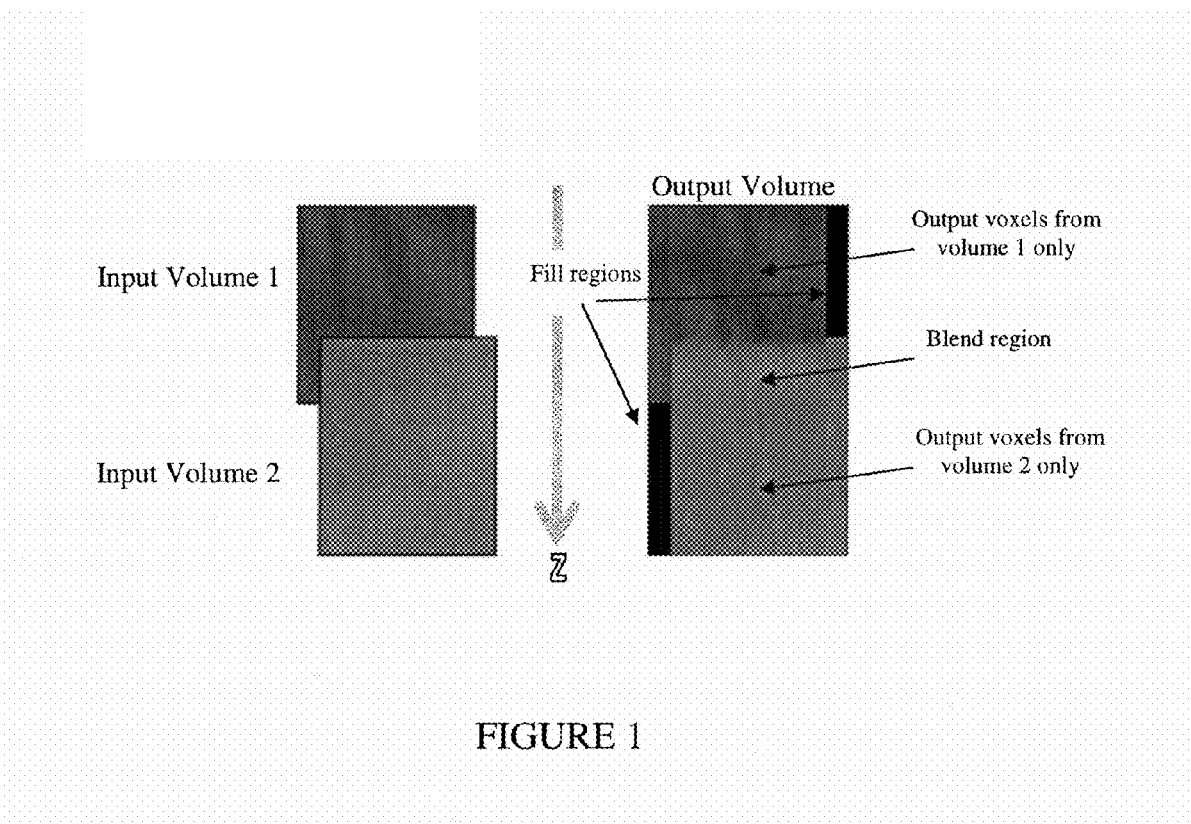
FIG. 1 is an illustration which shows stitching aligned volumes together by blending first and second volumes in the overlap area of the first and second volumes.

A preferred embodiment of the invention will be described, but the invention is not limited to this embodiment.

The invention provides a method for composing image volumes obtained using a medical scanning device, comprising the steps of: using a medical scanning device to obtain data of at least two image volumes of a patient, said image volumes having an overlap region; processing the data from the two image volumes to determine the overlap region and to register the two image volumes with each other using rigid registration; determining a non-rigid deformation between the two image volumes using an elastic registration algorithm; performing an alpha-morphing on each overlapping region of each image volume using the non-rigid deformation; and obtaining a blend region of the overlap region by performing an alpha-blending which blends the two image volumes by varying the relative contribution of the two image volumes using the results of alpha-morphing.

The medical scanning device may be selected from the group consisting of MRI, CT, Ultrasound, Radiography, and PET imagers. The elastic registration algorithm may be based on the maximization of an intensity-based similarity metric between the two image volumes. The metric may be selected from the group consisting of Local Cross Correlation and Mutual Information. The elastic registration algorithm may model the deformation as a smooth vector field that indicates, for each pixel in one of the image volumes, its corresponding pixel location in a second image in the other image volume. The deformation and its inverse may be estimated iteratively by maximizing an intensity-based similarity metric and are regularized using a low-pass filter. The method may include computing values of $I_{m1}$ and $I_{m2}$, according to the following equation:

$$I_{m1} = I_1 \circ (\alpha \varnothing_k)$$

$$I_{m2} = I_2 \circ ((1-\alpha)\phi_k)$$

wherein $I_{m1}$ represents a first intermediate image volume result, $I_{m2}$ represents a second intermediate image volume result. $\alpha$ is a parameter with a range [0.0,1.0] which linearly increases from the top to the bottom of the blend region, where $\varnothing_k$ represents a deformation field mapping the calculated non-rigid displacement of $I_1$ to $I_2$, where $\phi_k$ represents a calculated non-rigid displacement of $I_2$ to $I_1$, where $I_1$ represents a top overlapping image volume, and where $I_2$ represents a bottom overlapping image volume. The may include computing values of $I_{blend}$ according to the equation of:

$$I_{blend} = (1-\alpha)I_{m1} + \alpha I_{m2},$$

wherein $\alpha$ is a parameter with a range [0.0,1.0] which linearly increases from the top to the bottom of the blend region, where $I_{blend}$ represents a composed overlap region, wherein $I_{m1}$ represents a first intermediate image volume result, and $I_{m2}$ represents a second intermediate image volume result. The image volumes may be partial volumes of a patient's entire anatomy. The method may further include the step of displaying at least a portion of the two image volumes, including the overlap region. The portion may be a slice which extends over the two image volumes, including the overlap region.

The invention provides an article of manufacture comprising a computer-usable medium having computer-readable program code embodied therein for composing a composite image from at least two smaller images, the computer-readable program code having instructions for performing the following steps: obtaining data of at least two image volumes of a patient, said image volumes having an overlap region; processing the data from the two image volumes to determine the overlap region and to register the two image volumes with each other using rigid registration; determining a non-rigid deformation between the two image volumes using an elastic registration algorithm; performing an alpha-morphing on each overlapping region of each image volume using the non-rigid deformation; and obtaining a blend region of the overlap region by performing an alpha-blending which blends the two image volumes by varying the relative contribution of the two image volumes using the results of alpha-morphing.

The medical scanning device may be selected from the group consisting of MRI, CT, Ultrasound, Radiography, and PET imagers. The elastic registration algorithm may be based on the maximization of an intensity-based similarity metric between the two image volumes. The metric may be selected from the group consisting of Local Cross Correlation and Mutual Information. A deformation field may be determined by obtaining a smooth vector field that indicates for each pixel in one of the image volumes, its corresponding pixel location in a second image in the other image volume. The deformation and its inverse may be estimated iteratively by maximizing an intensity-based similarity matrix and are regularized using a low-pass filter. The instructions may include computing values of $I_{m1}$ and $I_{m2}$, according to the following equation:

$$I_{m1} = I_1 \circ (\alpha \varnothing_k)$$

$$I_{m2} = I_2 \circ ((1-\alpha)\phi_k)$$

wherein $I_{m1}$ represents a first intermediate image volume result, $I_{m2}$ represents a second intermediate image volume result, $\alpha$ is a parameter with a range [0.0,1.0] which linearly increases from the top to the bottom of the blend region, where $\varnothing_k$ represents a deformation field mapping the calculated non-rigid displacement of $I_1$ to $I_2$, where $\phi_k$ represents a calculated non-rigid displacement of $I_2$ to $I_1$, where $I_1$ represents a top overlapping image volume, and where $I_2$ represents a bottom overlapping image volume. The instructions may include computing values of $I_{blend}$ according to the equation of:

$$I_{blend} = (1-\alpha)I_{m1} + \alpha I_{m2},$$

wherein $\alpha$ is a parameter with a range [0.0,1.0] which linearly increases from the top to the bottom of the blend region, where $I_{blend}$ represents the composed overlap region, wherein $I_{m1}$ represents a first intermediate image volume result, and $I_{m2}$ represents a second intermediate image volume result. The image volumes may be partial volumes of a patient's entire anatomy. The instructions may include displaying at least a portion of the two image volumes, including the overlap region. The portion may be a slice which extends over the two image volumes, including the overlap region.

The invention provides a system for composing an image from two smaller image volumes of data obtained using a medical scanning device, comprising: a scanner for obtaining image data for at least two image volumes of a patient, wherein the image volumes have an overlap region; a processor for: processing the data from the two image volumes to determine the overlap region and to register the two image volumes with each other using rigid registration; determining a non-rigid deformation between the two image volumes using an elastic registration algorithm; performing an alpha-morphing on each overlapping region of each image volume using the non-rigid deformation; and obtaining a blend region of the overlap region by performing an alpha-blending which blends the two image volumes by varying the relative contribution of the two image volumes using the results of alpha-morphing.

The medical scanning device may be selected from the group consisting of MRI, CT, Ultrasound, Radiography, and PET imagers. The elastic registration algorithm may be based on the maximization of an intensity-based similarity metric between the two image volumes. The metric may be selected from the group consisting of Local Cross Correlation and Mutual Information. The processor may determine a deformation field by obtaining a smooth vector field that indicates for each pixel in one of the image volumes, its corresponding pixel location in a second image in the other image volume. The deformation and its inverse may be estimated iteratively by maximizing an intensity-based similarity matrix and are regularized using a low-pass filter. The processor may perform an alpha-morphing by computing values of $I_{m1}$ and $I_{m2}$, according to the following equation:

$$I_{m1} = I_1 \circ (\alpha \varnothing_k)$$

$$I_{m2} = I_2 \circ ((1-\alpha) \phi_k)$$

wherein $I_{m1}$ represents a first intermediate image volume result, $I_{m2}$ represents a second intermediate image volume result, $\alpha$ is a parameter with a range [0.0,1.0] which linearly increases from the top to the bottom of the blend region, where $\varnothing_k$ represents a deformation field mapping the calculated non-rigid displacement of $I_1$ to $I_2$, where $\phi_k$ represents a calculated non-rigid displacement of $I_2$ to $I_1$, where $I_1$ represents a top overlapping image volume, and where $I_2$ represents a bottom overlapping image volume. The processor may obtain a blend region by computing values of $I_{blend}$ according to the equation of:

$$I_{blend} = (1-\alpha) I_{m1} + \alpha I_{m2},$$

wherein $\alpha$ is a parameter with a range [0.0,1.0] which linearly increases from the top to the bottom of the blend region, where $I_{blend}$ represents a composed overlap region, wherein $I_{m1}$ represents a first intermediate image volume result, and $I_{m2}$ represents a second intermediate image volume result. The image volumes may be partial volumes of a patient's entire anatomy. The system may include a display for displaying at least a portion of the two image volumes, including the overlap region. The portion may be a slice which extends over the two image volumes, including the overlap region.

Figure 2:
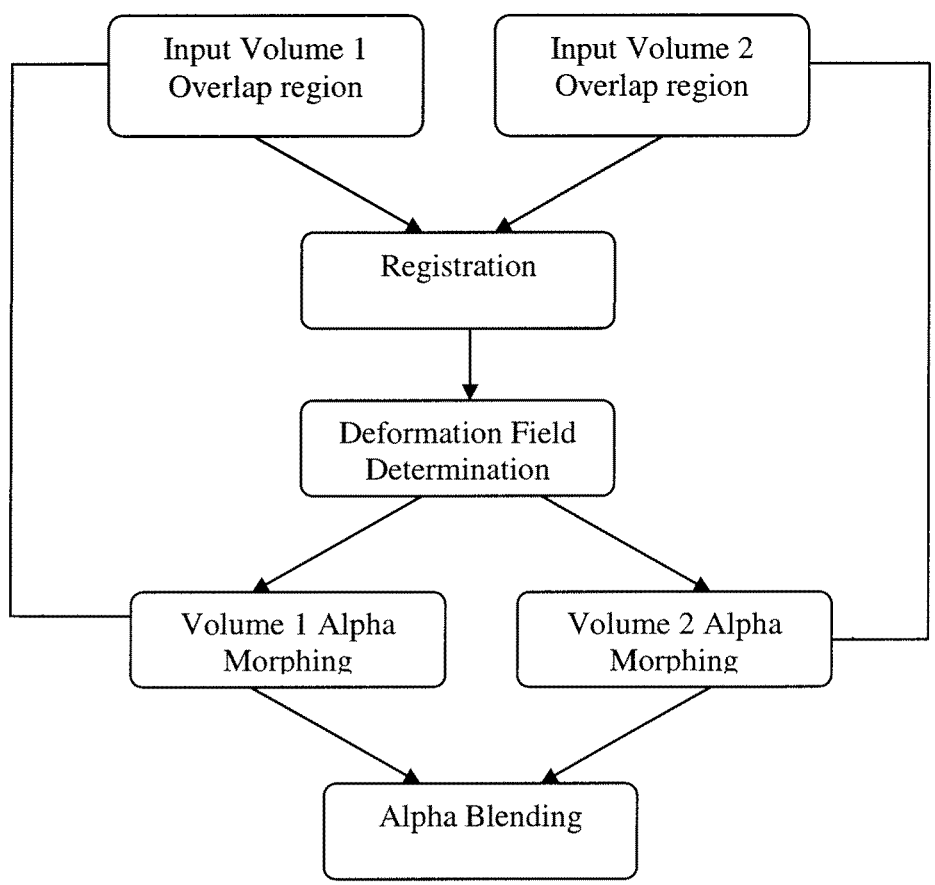
FIG. 2 is a functional flowchart showing the steps involved in the method according to the invention.

A method will be described using an example of two volume regions which overlap each other. As illustrated in FIG. 1, each volume has a region which overlaps with the adjoining volume. FIG. 2 shows first steps of inputting image data for input volume 1 and input volume 2 in the overlap region.

Offsets of the two volumes are initially determined either from the machine parameters of the scanner, or via an initial alignment stage.

The next steps involve registration and deformation field determination. The base method used for determination of the deformation field is based on previous research [2] [3], and is as follows.

The correspondence between overlapping areas of an image pair is established via elastic registration. The algorithm estimates a deformation that maximizes the local cross-correlation between one of the images (arbitrarily defined as reference) and the second image. In our experiments, this criterion has proved quite robust to intensity changes, signal inhomogeneities, and noise. In addition, such intensity-based approach does not require the extraction of anatomical landmarks. The deformation is represented by a smooth vector field that gives for each pixel on the reference, its corresponding location on the second image. Due to the nature of the distortions expected at the boundary of the field of view, deformations are constrained along the read-out direction. The algorithm estimates simultaneously, the deformation and its inverse, by composition of small displacements, incrementally maximizing the similarity criterion. This process, which can be seen as the numerical implementation of a transport equation, provides a large capture range.

The smoothness of the deformation is imposed by applying a low-pass filter to the vector field increments. The process is implemented in a multi-scale approach, from coarse to fine resolution, which increases the speed and provides improved convergence.

The pseudo code which is used may have the following steps:

| | |
|---|---|
| Input: | $I_1$, $I_2$, σ (regularization parameter) |
| Output: | $\varnothing_k$ and $\phi_k$ (deformation and its approximated inverse) |
| 1: | $\varnothing_0$ = id |
| 2: | while k max_iter do |
| 3: | compute $v_k = \nabla S(I_1, I_2, \varnothing_k)$ (gradient of the local cross-correlation) |
| 4: | regularize $v_k$ by convolution with a Gaussian window $w_k = G_\sigma * v_k$ |
| 5: | update $\varnothing_{k+1} = \varnothing_k$ (id +$tw_k$) |
| 6: | update $\phi_{k+1}$ = (id −$tw_k$) $\phi_k$ |
| 7: | set k ← k + 1 |
| 8: | end while |

The method used for registration according to the invention varies from the prior known methods in at least two respects.

First, the method uses constraint deformation to better model B0 distortion which occurs mainly in the readout (horizontal direction). This has caused a substantial improvement in computation time, and quality of result.

Second, the method according to the invention simultaneously generates a compatible inverse deformation to assist in the alpha morphing stages.

In alpha morphing, the deformation field describes a one-to-one correspondence between voxels in the two overlap regions. However, in order to avoid seams in the blending area at the two interfaces (Volume 1<−>Blend Region, and Blend Region<−>Volume 2), the effects of blending should be gradual, because instantaneous changes will cause visible discontinuities at these interfaces:

$$I_{m1} = I_1 \circ (\alpha \varnothing_k)$$

$$I_{m2} = I_2 \circ ((1-\alpha) \phi_k)$$

where $I_{m1}$ represents the first intermediate image volume result, $I_{m2}$ represents the second intermediate image volume result, α is a parameter with a range [0.0,1.0] which linearly increases from the top to the bottom of the blend region where $\varnothing_k$ represents the deformation field mapping the calculated non-rigid displacement of $I_1$ to $I_2$, where $\phi_k$ represents the calculated non-rigid displacement of $I_2$ to $I_1$, where $I_1$ represents the top overlapping image volume, and where $I_2$ represents the bottom overlapping image volume. The operator "°" represents the displacement of the elements of an image field by the matrix represented in the deformation field (in voxels).

Alpha blending is a technique of combining two images (or volumes) by varying relative contributions over a blend region. This is used to finally combine the resultants from alpha morphing to create the final elastic blend region. $I_{blend}$ is calculated using:

$$I_{blend}=(1-\alpha)I_{m1}+\alpha I_{m2}$$

where α is a parameter with a range [0.0,1.0] which linearly increases from the top to the bottom of the blend region, where $I_{blend}$ represents the composed overlap region, $I_{m1}$ represents the first intermediate image volume result, and $I_{m2}$ represents the second intermediate image volume result.

The method according to the invention has been shown to result in significant improvement in the presence of many kinds of distortion and motion, not just B0-effects.

Figure 6:
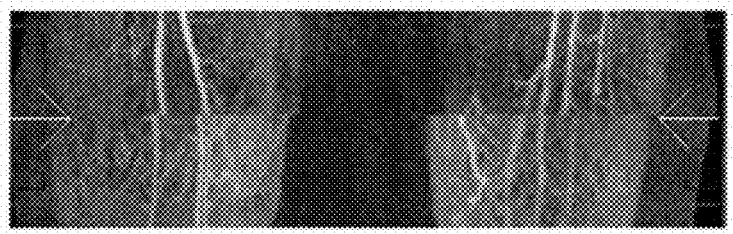
FIG. 6 is a composite original image, like that of FIG. 3, but for a second-case example.
Figure 7:
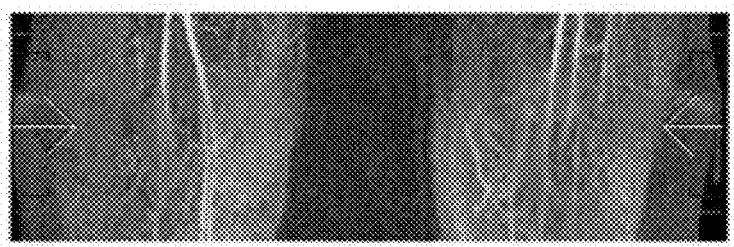
FIG. 7 is an image overlap region like that of FIG. 4, but for a second-case example.
Figure 8:
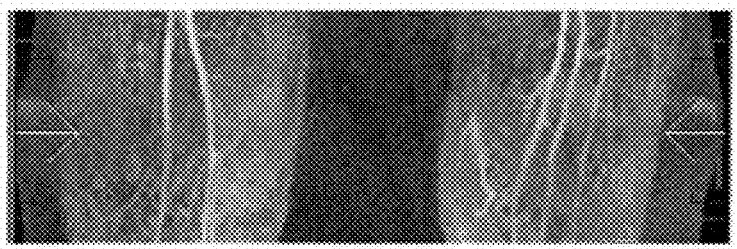
FIG. 8 is an image overlap region like that of FIG. 5, but for a second-case example.

Two case examples were performed. The first example case is shown in FIGS. 3-5, and the second example case is shown in FIGS. 6-8.

Figure 3:
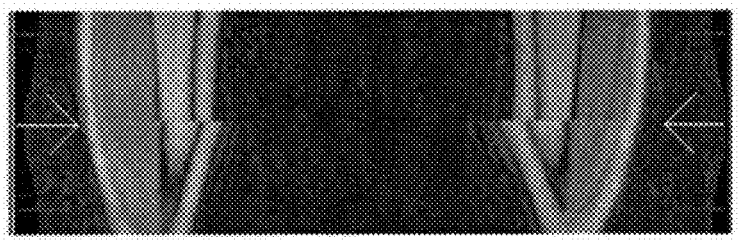
FIG. 3 is a composite original image overlap region with no blending, showing only a midpoint outline, for one case example.
Figure 4:
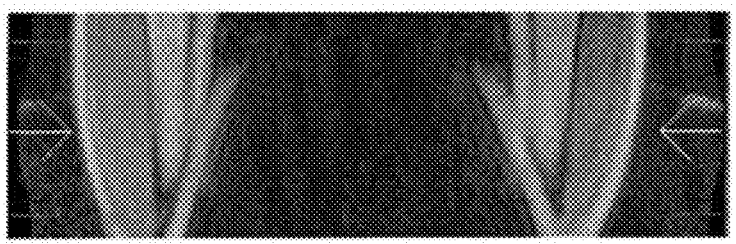
FIG. 4 is an image overlap region like that of FIG. 3, but with alpha-blending only, showing ghosting effects, for the one-case example.
Figure 5:
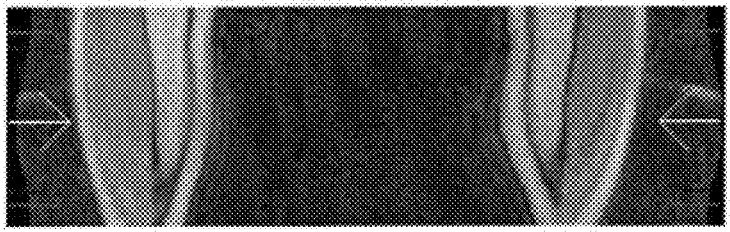
FIG. 5 is an image overlap region with both alpha-morphing and alpha-blending, for the one-case example of FIGS. 3 and 4.

FIGS. 3-5 shows the advantages of using the method according to the invention in the first case. In this case, areas with B0-effects were mosaiced. The seam between two volumes suffered from mild distortions due to B0.

FIG. 3 shows an original overlap region with no blending. The horizontal midpoint outline can be seen by the side arrows.

FIG. 4 shows an image overlap region with alpha-bending only. The ghosting effects can be seen at the midpoint cutline between the side arrows.

FIG. 5 shows an image overlap region with alpha-morphing and alpha-blending. The region between the side arrows appears to be free of artifacts and anomalies, at the region between the side arrows.

FIGS. 6-8 show images like that of FIGS. 3-5, but for a second-case example. Similar results were obtained in the alpha-blending only (FIG. 7), and in the alpha-morphing and alpha-blending (FIG. 8).

The invention also provides a system which practices the method, and a computer-readable storage medium having stored therein, computer executable instructions for practicing the method.

Figure 9:
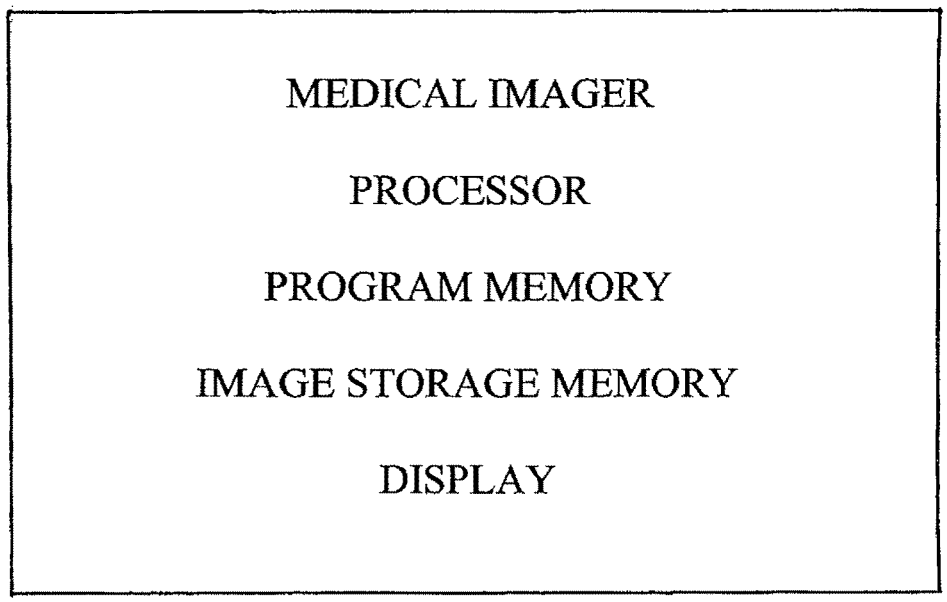
FIG. 9 is a block diagram of a medical imager system which may be used to practice the method according to the invention.

FIG. 9 is a block diagram of a medical imager system, which may be in the form of an MRI system, CT system, Ultrasound system, Radiography system, PET imager or other imager. The system can acquire image data, and comprises a processor, program memory, an image storage memory and a display device, as well as appropriate user input controls.

Although one preferred embodiment has been described, the invention is not limited to this embodiment, and the scope of the invention is defined by way of the following claims.

REFERENCES

[1] J. Sled, G. Pike, *Correction for B0 and B1 Variations in Quantitative Measurements Using MRI, Magnetic Resonance in Medicine*, Vol. 43, No. 4, 2000, p. 589-593

[2] *Flows of Diffeomorphisms for Multimodal Image Registration*, C. Chefd'hotel, G. Hermosillo, O. Faugeras, *Proceedings of the IEEE International Symposium Biomedical Imaging*, July, 2002, Washington, D.C., USA

[3] *A Variational Approach to Multimodal Image Matching*, C. Chefd'hotel, G. Hermosillo, O. Faugeras, *Proceedings of the ICCV Workshop on Variational and Level Set Methods in Computer Vision*, July, 2001, Vancouver, B.C., Canada

The invention claimed is:

1. A computer implemented method for composing image volumes obtained using a medical scanning device, comprising the steps of:
   a. using a medical scanning device to obtain data of at least two image volumes of a patient, said image volumes having an overlap region;
   b. processing the data from the two image volumes to determine the overlap region and to register the two image volumes with each other using rigid registration;
   c. determining a non-rigid deformation between the two image volumes using an elastic registration algorithm;
   d. performing an alpha-morphing on each overlapping region of each image volume using the non-rigid deformation by computing first intermediate image volume result $I_{m1}$ and second intermediate image volume result $I_{m2}$, according to the following equation:

$$I_{m1}=I_1°(\alpha\varnothing_k)$$

$$I_{m2}=I_2°((1-\alpha)\phi_k)$$

wherein α is a parameter with a range [0.0,1.0] which linearly increases from a top to a bottom of each overlapping region, wherein $\varnothing_k$ represents the non rigid deformation mapping $I_1$ to $I_2$, $\phi_k$ represents the non-rigid deformation mapping $I_2$ to $I_1$, $I_1$ represents a top overlapping image volume, and $I_2$ represents a bottom overlapping image volume; and
   e. obtaining a blend region of the overlap region by performing an alpha-blending which blends the two intermediate image volume results by varying the relative contribution of the two image volumes using the results of alpha-morphing,
   wherein steps b, c, d, and e are performed by a computer processor.

2. The method of claim 1, wherein the medical scanning device is selected from the group consisting of MRI, CT, Ultrasound, Radiography, and PET imagers.

3. The method of claim 1, wherein the elastic registration algorithm is based on the maximization of an intensity-based similarity metric between the two image volumes.

4. The method of claim 3, wherein the metric is selected from the group consisting of Local Cross Correlation and Mutual Information.

5. The method of claim 1, wherein the elastic registration algorithm models the deformation as a smooth vector field that indicates, for each pixel in one of the image volumes, its corresponding pixel location in a second image in the other image volume.

6. The method of claim 5, wherein in step c. the deformation and its inverse are estimated iteratively by maximizing an intensity-based similarity metric and are regularized using a low-pass filter.

7. The method according to claim 1, wherein the step e. includes computing values of $I_{blend}$ according to the equation of:

$$I_{blend}=(1-\alpha)I_{m1}+\alpha I_{m2},$$

wherein α is a parameter with a range [0.0,1.0] which linearly increases from the top to the bottom of the blend region, where $I_{blend}$ represents a composed overlap region, wherein $I_{m1}$ represents the first intermediate image volume result, and $I_{m2}$ represents the second intermediate image volume result.

8. The method of claim 1, wherein the image volumes are partial volumes of a patient's entire anatomy.

9. The method of claim 1, further including the step of displaying at least a portion of the two image volumes, including the overlap region.

10. The method of claim 9, wherein the portion is a slice which extends over the two image volumes, including the overlap region.

11. An article of manufacture comprising a non-transitory computer-usable medium having computer-readable program code embodied therein for composing a composite image from at least two smaller images, the computer-readable program code having instructions for performing the following steps:
  a. obtaining data of at least two image volumes of a patient, said image volumes having an overlap region;
  b. processing the data from the two image volumes to determine the overlap region and to register the two image volumes with each other using rigid registration;
  c. determining a non-rigid deformation between the two image volumes using an elastic registration algorithm;
  d. performing an alpha-morphing on each overlapping region of each image volume using the non-rigid deformation by computing first intermediate image volume result $I_{m1}$ and second intermediate image volume result $I_{m2}$, according to the following equation:

$$I_{m1}=I_1°(\alpha\varnothing_k)$$

$$I_{m2}=I_2°((1-\alpha)\phi_k)$$

wherein α is a parameter with a range [0.0,1.0] which linearly increases from a top to a bottom of each overlapping region, wherein $\varnothing_k$ represents the non rigid deformation mapping $I_1$ to $I_2$, $\phi_k$ represents the non-rigid deformation mapping $I_2$ to $I_1$, $I_1$ represents a top overlapping image volume, and $I_2$ represents a bottom overlapping image volume; and
  e. obtaining a blend region of the overlap region by performing an alpha-blending which blends the two intermediate image volume results by varying the relative contribution of the two image volumes using the results of alpha-morphing.

12. The article of claim 11, wherein the medical scanning device is selected from the group consisting of MRI, CT, Ultrasound, Radiography, and PET imagers.

13. The article of claim 11, wherein the elastic registration algorithm is based on the maximization of an intensity-based similarity metric between the two image volumes.

14. The article of claim 13, wherein the metric is selected from the group consisting of Local Cross Correlation and Mutual Information.

15. The article of claim 11, wherein the step c. includes determining a deformation field by obtaining a smooth vector field that indicates for each pixel in one of the image volumes, its corresponding pixel location in a second image in the other image volume.

16. The article of claim 15, wherein in step c., the deformation and its inverse are estimated iteratively by maximizing an intensity-based similarity matrix and are regularized using a low-pass filter.

17. The article according to claim 11, wherein the step e. includes computing values of $I_{blend}$ according to the equation of:

$$I_{blend}=(1-\alpha)I_{m1}+\alpha I_{m2},$$

wherein α is a parameter with a range [0.0,1.0] which linearly increases from the top to the bottom of the blend region, where $I_{blend}$ represents the composed overlap region, wherein $I_{m1}$ represents the first intermediate image volume result, and $I_{m2}$ represents the second intermediate image volume result.

18. The article of claim 11, wherein the image volumes are partial volumes of a patient's entire anatomy.

19. The article of claim 11, further including the step of displaying at least a portion of the two image volumes, including the overlap region.

20. The article of claim 19, wherein the portion is a slice which extends over the two image volumes, including the overlap region.

21. A system for composing an image from two smaller image volumes of data obtained using a medical scanning device, comprising:
  a scanner for obtaining image data for at least two image volumes of a patient, wherein the image volumes have an overlap region;
  a processor for:
  a. processing the data from the two image volumes to determine the overlap region and to register the two image volumes with each other using rigid registration;
  b. determining a non-rigid deformation between the two image volumes using an elastic registration algorithm;
  c. performing an alpha-morphing on each overlapping region of each image volume using the non-rigid deformation by computing first intermediate image volume result $I_{m1}$ and second intermediate image volume result $I_{m2}$, according to the following equation:

$$I_{m1}=I_1°(\alpha\varnothing_k)$$

$$I_{m2}=I_2°((1-\alpha)\phi_k)$$

wherein α is a parameter with a range [0.0,1.0] which linearly increases from a top to a bottom of each overlapping region, wherein $\varnothing_k$ represents the non rigid deformation mapping $I_1$ to $I_2$, $\phi_k$ represents the non-rigid deformation mapping $I_2$ to $I_1$, $I_1$ represents a top overlapping image volume, and $I_2$ represents a bottom overlapping image volume; and
  d. obtaining a blend region of the overlap region by performing an alpha-blending which blends the two intermediate image volume results by varying the relative contribution of the two image volumes using the results of alpha-morphing.

22. The system of claim 21, wherein the medical scanning device is selected from the group consisting of MRI, CT, Ultrasound, Radiography, and PET imagers.

23. The system of claim 21, wherein the elastic registration algorithm is based on the maximization of an intensity-based similarity metric between the two image volumes.

24. The system of claim 21, wherein the metric is selected from the group consisting of Local Cross Correlation and Mutual Information.

25. The system of claim 21, wherein the processor determines a deformation field by obtaining a smooth vector field that indicates for each pixel in one of the image volumes, its corresponding pixel location in a second image in the other image volume.

26. The system of claim 25, wherein the deformation and its inverse are estimated iteratively by maximizing an intensity-based similarity matrix and are regularized using a low-pass filter.

27. The system according to claim 21, wherein the processor obtains a blend region by computing values of $I_{blend}$ according to the equation of:

$$I_{blend} = (1-\alpha)I_{m1} + \alpha I_{m2},$$

wherein $\alpha$ is a parameter with a range [0.0,1.0] which linearly increases from the top to the bottom of the blend region, where $I_{blend}$ represents a composed overlap region, wherein $I_{m1}$ represents the first intermediate image volume result, and $I_{m2}$ represents the second intermediate image volume result.

28. The system of claim 21, wherein the image volumes are partial volumes of a patient's entire anatomy.

29. The system of claim 21, further including a display for displaying at least a portion of the two image volumes, including the overlap region.

30. The system of claim 29, wherein the portion is a slice which extends over the two image volumes, including the overlap region.

* * * * *